Sept. 24, 1963   J. STURM   3,105,229
TEMPERATURE SENSING DEVICE
Filed Dec. 8, 1958
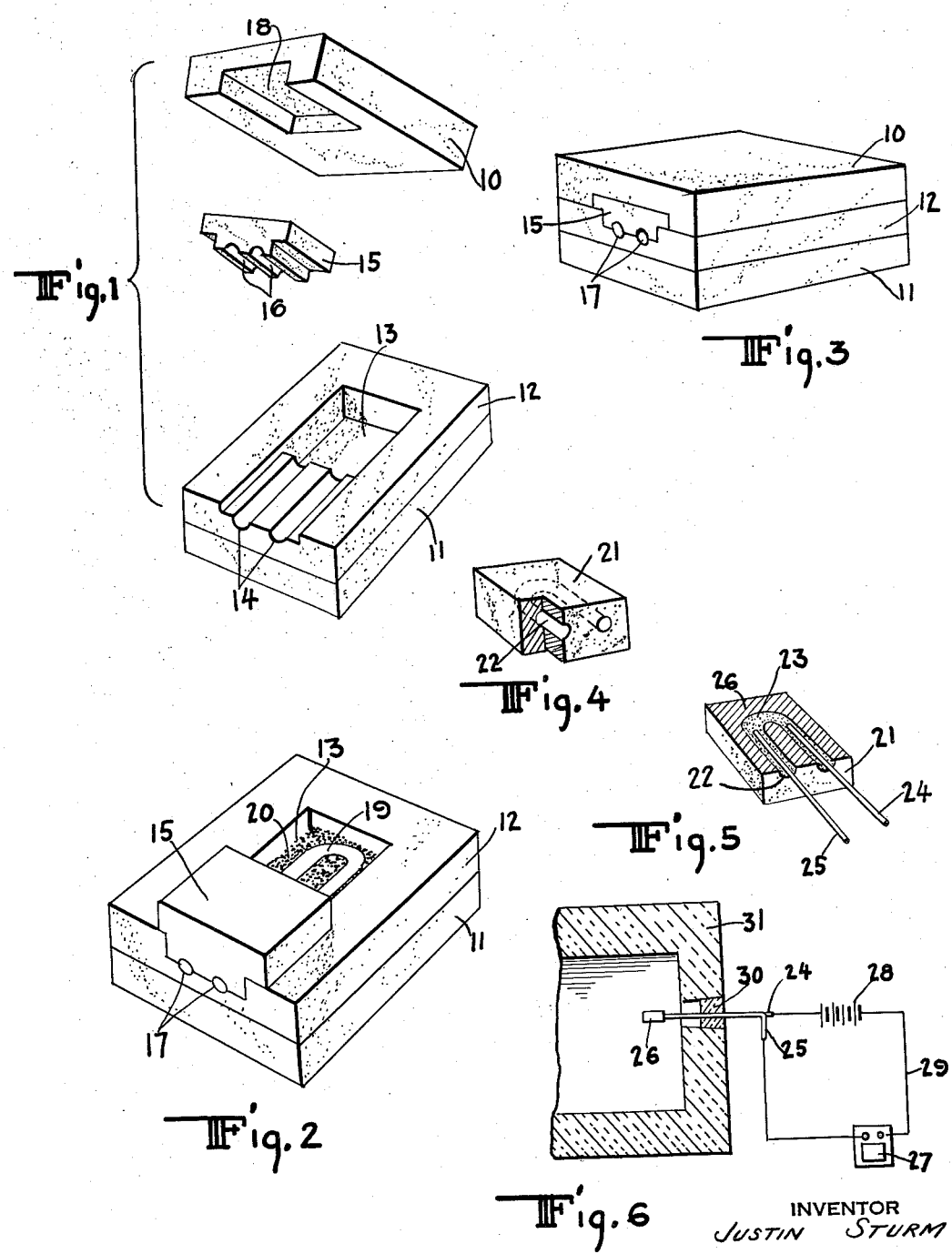
INVENTOR
JUSTIN STURM
BY
Pollard Johnston Snyther Robertson
ATTORNEYS

United States Patent Office 3,105,229
Patented Sept. 24, 1963

3,105,229
TEMPERATURE SENSING DEVICE
Justin Sturm, Norwalk, Conn.
(P.O. Box 4, Westport, Conn.)
Filed Dec. 8, 1958, Ser. No. 778,890
3 Claims. (Cl. 340—227)

This invention relates to a temperature indicating or signalling device, and particularly to temperature sensing devices useful at highly elevated temperatures in the ceramic or similar arts.

This application is a continuation-in-part of copending application Serial No. 677,735, filed August 12, 1957, now abandoned.

Previously used devices for indicating exact temperatures, especially highly elevated temperatures, such as "Seeger" cones, have not been completely satisfactory because visual observation has been required. Visual observation necessitates constant watching which is time consuming and may not always be feasible. As an example, in firing ceramics in a furnace, it is necessary to know when a predetermined elevated temperature is reached. In many instances, several furnaces or kilns may be in use so that the operator wishes to attend several at the same time.

One of the objects of the invention is to provide a simple and yet versatile temperature indicating device which will not require continuous visual observation.

Another object of the invention is to provide a temperature indicating device which can be repeatedly used to indicate a predetermined temperature.

A still further object of the invention is to provide a temperature sensing device which can repeatedly be used to sense a predetermined severe temperature in a monitored heat zone and indicate the sensed temperature by acting as a switching means at the predetermined temperature to close an electric circuit and activate a signal means in the circuit.

In one aspect, the invention contemplates an indicating device having a source of electrical energy connected to a normally open electrical circuit due to the presence in the circuit of a normally nonconductive liquefiable solid connecting means. This connecting solid becomes at least partially liquid and conductive at a predetermined elevated temperature to close the circuit and thereby show that this predetermined elevated temperature has been reached. It is not necessary that the whole solid connecting means melt, or become liquid, it is only necessary that sufficient liquid be present, or phase change take place, to close the circuit and cause the current to flow. This change may be a surface phenomenon.

In a preferred aspect of the invention, the normally electrically nonconductive liquefiable solid connecting means is placed in a container which remains solid and electrically nonconductive at the temperature to be sensed. Spaced apart electrically conductive wires are provided which extend into the container into contact with the liquefiable solid and preferably extend into a body of the liquefiable solid. These wires provide means for connecting the sensing element into the above mentioned electrical circuit. The temperature sensing device preferably is in a body of normally solid inorganic salt contained in a molded refractory, or ceramic, material and connected with electrically conductive wires as will be described hereafter.

The above mentioned and other objects, advantages and features of the invention will become apparent from the following description and drawings which are merely exemplary.

In the drawings:

FIG. 1 is an exploded view of a composite mold for use in producing a preferred type of temperature sensing element.

FIG. 2 is a perspective view of a partly assembled mold of FIG. 1 showing the manner in which the container for the temperature sensing device is prepared for molding.

FIG. 3 is a perspective view of completely assembled mold of FIG. 1 ready for firing.

FIG. 4 is a perspective view partly broken away of a container for a temperature sensing normally non-conductive liquefiable solid which becomes electrically conductive upon melting.

FIG. 5 is a perspective cross-sectional view of temperature sensing device.

FIG. 6 is a schematic view, partially in section, of one form of the invention.

Referring sequentially to FIGS. 1-5, one method is illustrated for producing a temperature sensing device of this invention. FIG. 1 illustrates a basically four element mold adapted for molding the container for the heat sensing device hereof by the so-called lost wax molding method. The mold is composed of a top element 10, bottom element 11, an intermediate removable element 12 having a mold cavity 13 and provided with semicylindrical troughs 14. A second intermediate element 15 is provided with semi-cylindrical troughs 16 adapted to mate with the semi-cylindrical troughs 14 of intermediate removable element 12 to form cylindrical or suitably shaped holes 17 opening into cavity 13 in the assembled mold (FIGS. 2 and 3). In order to add strength to element 15 and greater rigidity to the assembly, element 15 may have a greater depth than half the depth of element 12 and is shaped to fit into recess 18 in element 10.

As shown in FIG. 2, a U-shaped body 19 of wax, or similar relatively low temperature melting material, is clamped between the troughs 14 and 15, respectively, of intermediate mold elements 12 and 15 so that it rigidly extends into and is suspended in cavity 13 between the top and bottom thereof. After the U-shaped wax body 19 is positioned in cavity 13, the cavity is filled with a finely divided electrically nonconductive refractory or ceramic material 20, such as sold under the name of "Corundite" which is a high alumina castable refractory. Instead of "Corundite," a fire clay may be used.

After the cavity 13 is filled with the heat formable electrically nonconductive material 20, the top 10 is placed on the mold and the electrically nonconductive material fired in a suitable furnace or oven. During the heat forming, the wax melts and runs out through the cylindrical holes 17 so as to leave an aperture in the formed body. Thus, a heat resistant electrically nonconductive container 21 (FIG. 4) is provided having a U-shaped cylindrical passageway 22 therethrough. It is to be understood that other types of molds can be used.

Then, as seen in FIG. 5, the U-shaped cylindrical passageway 22 is filled and packed with a body of a finely divided normally solid and normally electrically nonconductive substance 23 which becomes electrically conductive when it melts or at least partially changes phase at a predetermined temperature. Electrically conductive wires or leads 24 and 25 are embedded in the temperature responsive substance 23 packed into the two arms of the U-shaped passageway 22. The wires should be resistant to high temperatures and, for example, may be made of stainless steel, "Inconel" or the like. This assembly indicated generally by numeral 26, constitutes a temperature sensing device which may be readily connected into the temperature indicating electrical circuit such as illustrated in FIG. 6.

Referring to FIG. 6, indicator or audible means, such as buzzer 27, is connected to a source of electrical energy 28 through an electrical circuit 29. Circuit 29 is connected with wires 24 and 25 of the temperature sensing device 26 which are supported on a nonconductive base 30 located in a furnace or kiln 31. Other means can be used to hold the temperature sensing device 26 in operative relation to its supports or conductive elements.

A great variety of refractory castables, or castable fire clays are available which will stand up under the predetermined severe temperatures being monitored. The appropriate castable refractories, or fire clays, are readily available commercially to meet stated temperature conditions. It will be understood, that other types of heat resistant electrically nonconducive containers may be used in producing the temperature sensing devices hereof.

A number of normally solid materials are available which are substantially nonconductive in the solid state but liquefy and become conductive at a predetermined elevated temperature. As an example, nonconductive solids can be formulated which melt or at least partially liquefy and become conductive at a specific and sharply defined predetermined elevated temperature. By way of example, tableted solids sold under the name of "Tempil" pellets have these properties. These tablets may be ground and used to fill the cavity 22.

As specific examples, a "Tempil" pellet is available containing about 90% of sodium tungstate, about 1% of chromium oxide, and about 7.6% of matter which is lost by ignition, the pellet having a sharp melting phase change point at 1350° F. When such a ground pellet is placed in the temperature sensing device hereof and placed in the circuit of a furnace as described, current does not flow through the circuit at ordinary temperatures. Thus, the circuit can be considered to be open. As the temperature is increased until the temperature sensing device is exposed to a temperature of 1350° F., the mixture will melt, or partially liquefy to cause a phase change, and the circuit will be closed, to activate the indicator, thereby indicating that a temperature of 1350° F. has been reached in the furnace.

Other "Tempil" pellets for predetermined temperatures are available which function in the same manner. One such tablet contains about 57% of anhydrous sodium sulfate, about 36% of anhydrous strontium sulfate, and about 6% of matter which is lost by ignition and melts at 1650° F. Another pellet, which melts at 2000° F., contains about 84% of anhydrous manganese pyrophosphate and about 15% of matter which is lost by ignition. Also, anhydrous sodium carbonate melt at 1560° F. and becomes electrically conductive.

As mentioned, when using such powdered tablets or similar materials in the temperature indicating device of this invention, it is not necessary that the whole mass melt or become liquid. It is only necessary that sufficient liquid or phase change be present to close the circuit and permit current to flow therethrough.

While but one embodiment of the invention has been described and illustrated, it will be apparent to those skilled in the art that other embodiments, as well as modifications of the disclosed embodiments, may be made without departing from the spirit or scope of the invention except as defined in the appended claims.

What is claimed:

1. A pyrometric device for use with a closed furnace having insulated walls, comprising a source of electrical energy located outside said furnace, indicator means located outside said furnace, a heat resistant electrically nonconductive member including a U-shaped passage therein arranged such that the one extremities of the legs thereof terminate at an edge of said member, a pair of current conducting elements, each of said conducting elements extending into one of the legs of said U-shaped passage with their free ends terminating at the portion of said U-shaped passage that joins said legs, a solid mixture disposed within said passage in contact with the inner terminal ends of said current conducting elements, said solid mixture being substantially nonconductive in the solid state and becoming conductive upon change to the liquid phase at a predetermined temperature by absorption of heat from within said furnace, and means passing through the insulated walls of said furnace and connecting said source of electrical energy and said indicator means to said current conducting elements, the circuit formed being normally open and closing when the temperature inside the furnace reaches said predetermined temperature, whereby the current passing through said mixture and between the inner terminal ends of said current conducting elements activates said indicator means.

2. A temperature sensing element for electrically sensing a predetermined temperature in a temperature zone, comprising a heat resistant electrically nonconductive argillaceous member having a U-shaped passageway therein, said U-shaped passageway having a pair of legs extending outwardly through one surface of said member, a body of normally electrically nonconductive solid mixture in said passageway which becomes electrically conductive upon change to the liquid phase at a predetermined temperature, and a pair of spaced apart electrically conductive wires, one extending into each of said legs of said U-shaped passageway so that their inner ends are separated an amount equal to the spacing of the legs of said U-shaped passageway by a solid argillaceous wall, thereby forming a normally open switch which closes when the temperature reaches said predetermined temperature causing current to flow through said mixture and from the inner end of one wire to the inner end of the other wire.

3. A pyrometric device for use with a closed furnace having insulated walls, comprising a source of electrical energy located outside said furnace, indicator means located outside said furnace, a castable heat resistant electrically nonconductive argillaceous member having a U-shaped passage formed therein arranged such that the one extremities of the legs thereof terminate at an edge of said member, a pair of spaced apart electrically conductive rods located inside of said furnace, said rods having inner ends extending within the legs of said U-shaped passage to a point adjacent the connecting passage between said legs, a solid mixture including an inorganic salt located in said U-shaped passage between the inner ends of said rods, said solid mixture being substantially electrically nonconductive in the solid state and becoming electrically conductive upon change to a liquid phase at a predetermined temperature, said member and the solid mixture therein being supported in position in said furnace solely by said rods, and conductor means connecting said source of electrical energy, said indicator means and said spaced apart current conducting rods, the circuit so formal being normally open due to the spacing between the inner ends of said rods and closing when the temperature inside the furnace reaches said predetermined temperature, whereby the current flows through said mixture from the end of one rod to the end of the other rod upon said mixture changing to the liquid phase.

References Cited in the file of this patent

UNITED STATES PATENTS

| 262,054 | Kitsee | Aug. 1, 1882 |
| 856,162 | Kitsee | June 4, 1907 |
| 1,234,203 | Northrup | July 24, 1917 |
| 1,367,122 | Chubb | Feb. 1, 1921 |
| 1,646,746 | Carroll | Oct. 25, 1927 |
| 1,678,661 | Whitehead | July 31, 1928 |
| 2,543,177 | Korsgren | Feb. 27, 1951 |
| 2,640,089 | Gilberg | May 26, 1953 |
| 2,728,836 | De Boisblanc et al. | Dec. 27, 1955 |
| 2,804,610 | Curtis | Aug. 27, 1957 |
| 2,832,871 | Bachman | Apr. 29, 1958 |

FOREIGN PATENTS

| 537,155 | Great Britain | June 11, 1941 |
| 857,984 | Germany | Dec. 4, 1952 |